Oct. 29, 1940.   I. R. PIERSON ET AL   2,219,505
SPREADER
Filed Dec. 15, 1938   3 Sheets-Sheet 3
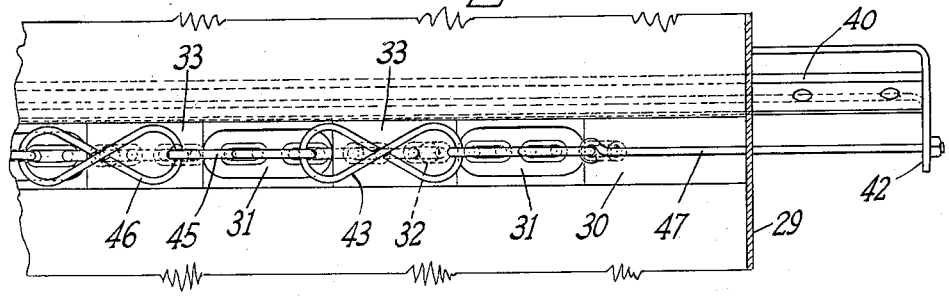
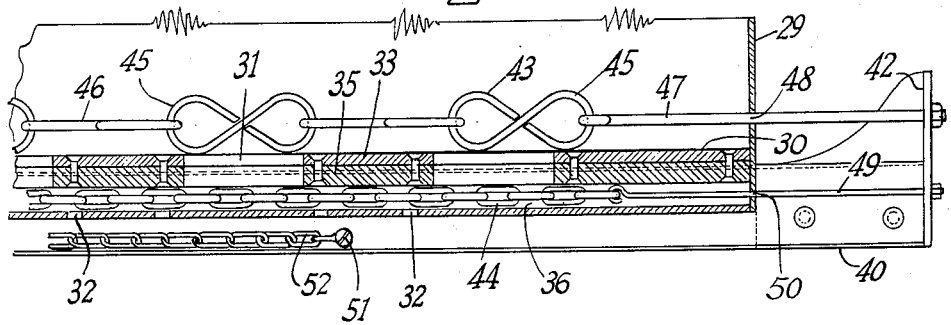
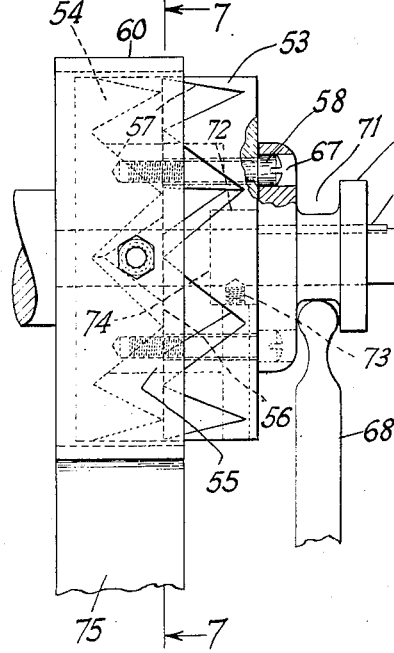
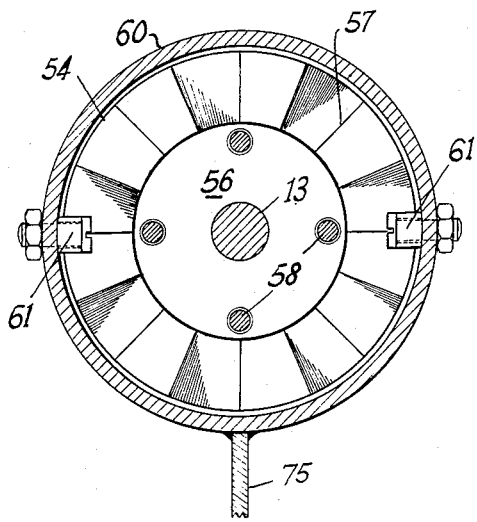
INVENTORS
*Irving R. Pierson* 2nd
*Alphonse Amrhyn*
BY
ATTORNEY.

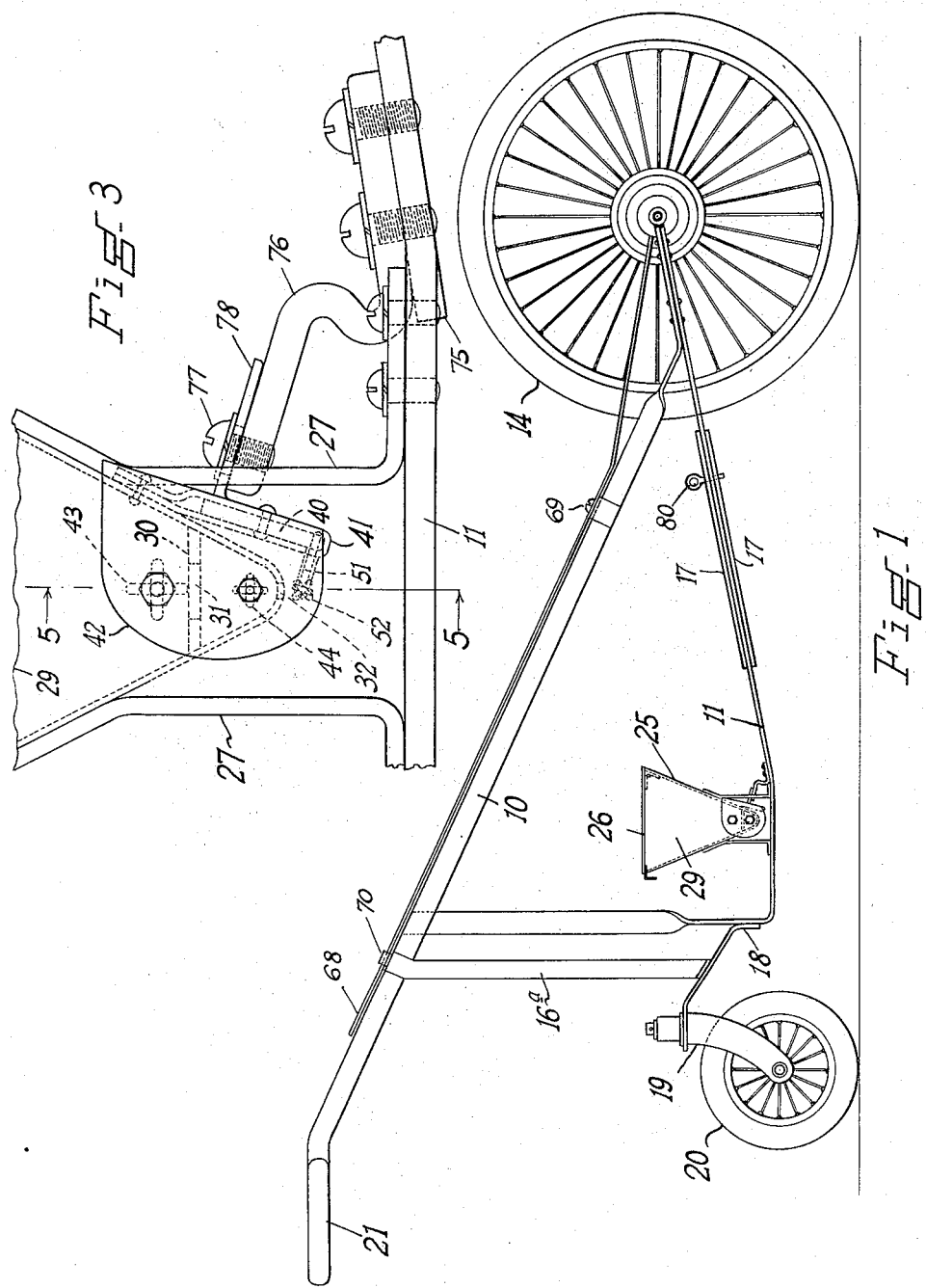

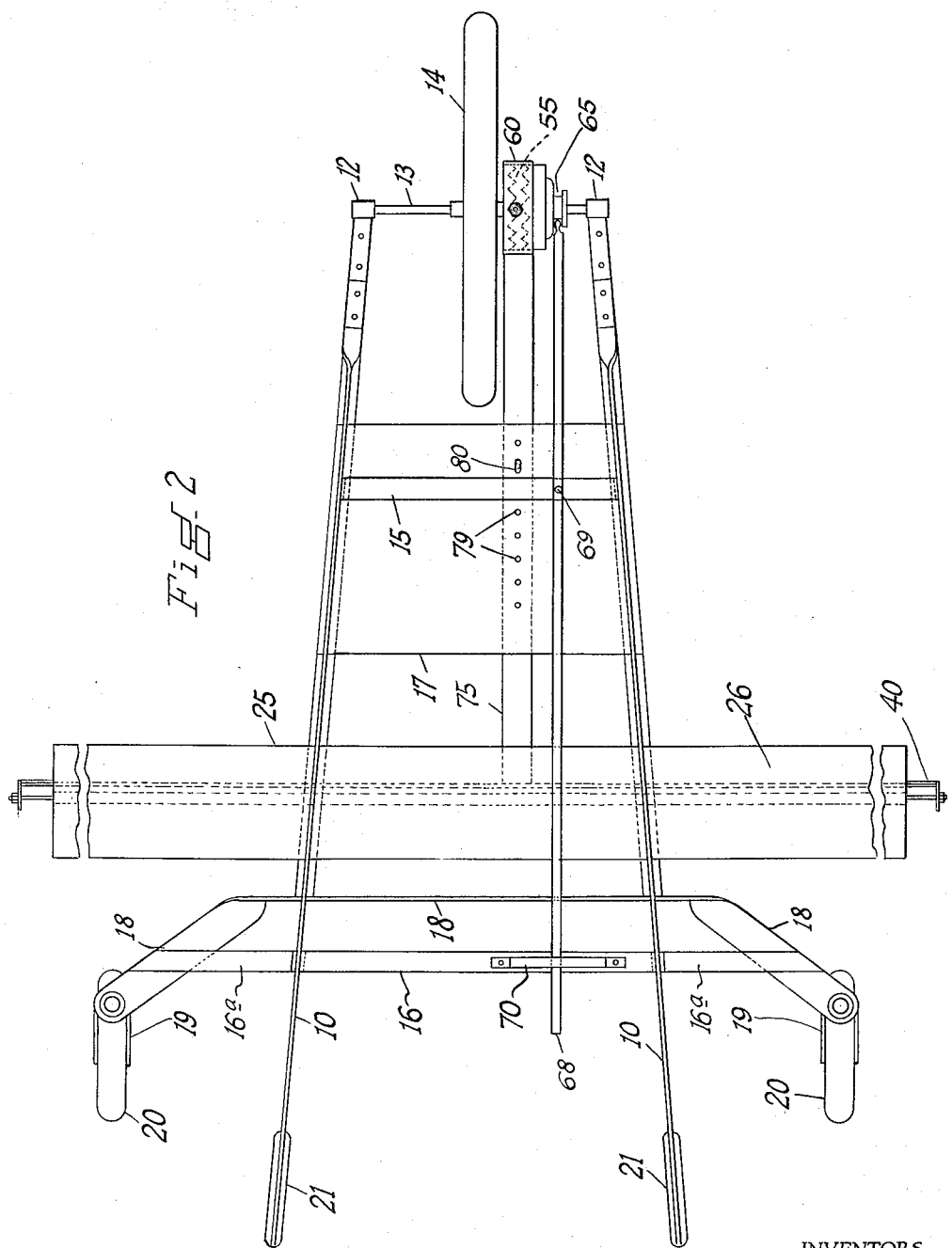

Patented Oct. 29, 1940

2,219,505

UNITED STATES PATENT OFFICE 2,219,505

SPREADER

Irving R. Pierson, New Haven, and Alphonse Amrhyn, Hamden, Conn., assignors of one-third to Goulard & Olena, Inc., New York, N. Y., a corporation of New York Application December 15, 1938, Serial No. 245,862

6 Claims. (Cl. 275—7)

The present invention relates to improvements in the construction and operation of portable machines for spreading material over a surface, and more particularly spreaders for distributing seed, fertilizer, and chemicals, over the ground.

The main object of our invention is the provision of a machine for the purpose described which is characterized by a uniform distribution of the material over the surface being treated, a wide range quantitative control of the distribution, its portability and maneuverability without damage to the surface over which it travels, little, if any, loss of material between points of use, and a relatively low cost of construction.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 1 is a side elevation of a spreader constructed in accordance with our invention;

Fig. 2 is a plan view, partly broken away, of the spreader shown in Fig. 1;

Fig. 3 is an enlarged end view of a portion of the feed hopper and discharge control provisions;

Fig. 4 is a fragmentary plan view of the parts shown in Fig. 3;

Fig. 5 is a fragmentary vertical section taken on the line 5—5 of Fig. 3;

Fig. 6 is an enlarged plan view of the clutch and lever oscillating mechanism shown in Fig. 2 with parts broken away and in section; and Fig. 7 is a vertical section taken on the line 7—7 of Fig. 6.

In the embodiment of the invention illustrated, the frame of the machine comprises a pair of inclined converging upper bar members 10 having their lower or forward ends bent upwardly and united with the forward ends of a pair of similarly converging lower bar members 11 to form transversely spaced bearings 12 for a horizontally arranged shaft 13, on which is fixed a front or driving wheel 14. The upper bars 10 are rigidly connected by a front cross-bar 15 and a rear cross-bar 16, while the lower bars 11 are connected by a pair of vertically spaced inclined plates 17 below the cross-bar 15 and by a rear cross-bar 18. The rear portions of the lower bars 11 are bent vertically and connected to the upper bars 10 adjacent the cross-bar 16. The ends of the cross-bar 18 are extended beyond the bars 11 and bent rearwardly and outwardly. A fork 19 carrying a small wheel 20 is swivel mounted in each end of the cross-bar 18. Bars 16a extend from the bars 10 adjacent the ends of the rear cross-bar 16 downwardly and outwardly and rigidly connect the bars 10 to the bent end portions of the cross-bar 18. The rear or upper ends of the bars 10 are bent horizontally and formed into handles 21 which are grasped by the user in pushing and maneuvering the machine. The wheels 14 and 20 are preferably provided with pneumatic tires. A light-weight rigid metallic frame is thus provided which can be easily moved and readily maneuvered without damaging the surface over which it travels.

A V-shaped metallic feed hopper 25 having a hinged cover 26 is symmetrically arranged transversely of the frame. The hopper extends a substantial distance beyond and is supported above the bars 11 through pairs of brackets 27 carried by the bars 11. The bottom of the hopper is slightly rounded, as indicated in Fig. 3. Triangular plates 29 close the ends of the hopper.

In use the hopper 25 is filled with the material to be distributed and mechanism hereinafter described is employed to uniformly distribute the material substantially throughout the length of the hopper over the surface to be treated. For this purpose a relatively narrow metallic plate 30 is horizontally arranged across the lower part of the hopper slightly above the bottom thereof. The plate 30 is formed with a series of uniformly spaced elongated openings 31 therein. The rounded bottom of the hopper is also formed with a series of openings 32 of substantially smaller area than the openings 31. The openings 32 are arranged in groups and confined to the portions of the hopper bottom below the plate portions 33 between the ends of adjacent openings 31. The plate portions 33 are preferably of approximately the same length as the plate openings 31. With this arrangement of the openings 31 and 32, any material dropping through the openings 31 will fall on unperforated portions of the hopper bottom. The plate portions 33 are preferably made of greater thickness than the alternating portions which include the openings 31, by securing flat hard wood strips 35 to the underside of the portions 33, leaving only a shallow narrow space 36 between the underside of each strip 35 and the hopper bottom. This hopper construction minimizes the loss of material through the openings 32 when the machine is out of use or being moved to a new point of use.

The material distributing mechanism comprises a flat bar 40 reciprocably mounted in spaced brackets 41 secured to the front side of the hopper 25 and arranged so that the lower edge of the bar 40 will extend below the level of and adjacent to the hopper bottom. On each end of the bar 40 is mounted an enlarged L-shaped bracket 42, between which are connected elements located within the hopper for effecting a regulable discharge of the material through the openings 31 and 32. In accordance with our invention, these elements advantageously consist of special chains 43 and 44. The chain 43 is formed by alternately arranged vertical and horizontal links 45 and 46 respectively and positioned by means of hook rods 47, which extend through corresponding openings 48 in the hopper end walls 29 to the brackets 42, so as to contact with the upper side of the hopper plate 30. The chain 43 is formed with links slightly longer than the openings 31 and serves as a material agitator and conveyor, whereby the material in the lower part of the hopper is kept constantly in movement when the chain is reciprocated. This action prevents the material bridging over the relatively narrow space between the sides of the hopper and facilitates a substantially uniform delivery of material through all of the openings 31.

The second chain 44 is arranged along the hopper bottom below the plate 30 and serves as a material grinding and conveying element. The ends of the chain are secured to the brackets 42 by hook rods 49 passing through openings 50 in the hopper end walls. The chain 44 is also formed by alternately arranged horizontal and vertical links, but of substantially smaller size than the chain links 45 and 46. The vertical links in the chain 44 extend nearly the full height of the shallow spaces 36, while the horizontal links extend nearly the full width of that portion of the hopper. In operation the portions of the chain below the openings 31 pick up the material depositing on the corresponding portions of the hopper bottom and, as the chain is moved, move the material along the bottom into the portions including the openings 32, through which the material then drops. The thickened plate portions 33 serve to limit the amount of material conveyed thereunder by the chain, and thereby the amount of material delivered to the openings 32. The passage of the chain through the confined spaces below the plate portions 33 also serves to crush any oversize material that may fall through the openings 31. Oversize particles are undesirable not only because of possible clogging of the small openings 32, but also because a high degree of fineness for the material discharged is generally desirable. By way of example and not of limitation, in a spreader of the construction described and particularly designed for use on golf courses, the openings 31 were made 1½" x ½", while the openings 32 were ¼" in diameter.

A third reciprocable chain 52 is advantageously arranged to spread the material falling through the openings 32, so that it will be uniformly distributed over the desired ground area. The chain 52 is mounted on the reciprocable bar 40 directly by pins 51 at spaced points thereon, the portions of the chain between the points of attachment being twisted to cause most of the chain links to be arranged in inclined planes. With the chain 52 reciprocated directly below the openings 32, substantially all of the material dropping from these openings will be dispersed by the chain and a uniform distribution of material on the ground effected.

The mechanism for reciprocating the bar 40, and thereby the chains 43, 44 and 52, comprises a rotatable circular cam having a circumferential zig-zag cam track on its periphery. As shown in Figs. 6 and 7, the cam is formed by two cam members 53 and 54 rotatably mounted on a reduced portion of the shaft 13 and held against movement axially of the shaft by a circular block 72 fixed on the shaft 13 by a tap screw 73 and fitting into a circular recess 74 in the outer side of the cam member 53. Each cam member has a circular central flat surface 56 and a peripheral series of oppositely inclined plane surfaces formed into a continuous undulating cam surface 57. The cam members are assembled as shown in Fig. 6 with their center surfaces 56 registering in contact and their cam surfaces 57 arranged to form a zig-zag cam track. The parts are held in their assembled position by symmetrically arranged tap screws 58, the heads of which are circular and project beyond the outer side of the cam member 53. A circular collar 60 fits loosely around the cam members and at diametrically opposite points carries a pair of fiber rollers or pins 61, which fit between the cam members and are actuated by the cam track 55. On rotation of the cam members, the collar 60 is given a transverse oscillatory movement relative thereto.

The cam members 53 and 54 are rotated by operatively connecting them to the drive shaft 13 by means of a clutch collar 65 slidably mounted on a key 66 carried by the shaft. The portion of the collar adjacent the cam member 53 is provided with openings 67 corresponding to the screw heads 58. The collar can be shifted along the drive shaft into a clutching position by a clutch lever 68 which is pivoted on the crossbar 15 by a pin 69 and extends through an inverted U-shaped bracket 70 on the cross-bar 16. The opposite end of the lever 68 fits into an annular recess 71 on the clutch collar. The operator can thus operatively connect the cam members to the drive shaft.

The oscillatory movement of the collar 60 is transmitted to the reciprocable bar 40 by a lever 75 welded to the collar at a point intermediate the pins 61 and extending to a point adjacent the hopper 25. A bent bracket 76 secured to the hopper end of the lever carries a pin 77 which fits into a slot in a lug 78 projecting from the bar 40. The lever is arranged between the frame plates 17 and provided with a series of holes 79 along its length adapted to register with similar holes in the frame plates. A removable pin 80 is positioned in one set of registering holes to form a pivot for the lever 75. The position of the pin 80 in the series of holes can be easily varied to shift the ratio of the arms of the lever 75 and thereby the amplitude of the oscillations of the operating bar 40 and chains 43, 44 and 52. A change in the amplitude of the chain movement will vary the feed of material to the openings 31 and 32 and thus control the amount of material discharged over a given area. The distribution of the material can be varied over a relatively wide range in this manner.

The spreader described has been found to be particularly effective in distributing grass seed, fertilizer and chemicals over ground areas. A controlled uniform discharge of even very finely divided material is obtainable in practice. The spreader can be successfully used by a relatively unskilled operator. Mechanical seeding and fertilizing of ground areas requiring careful treatment, such as golf greens, can be readily effected with a spreader constructed as described.

While in accordance with the provisions of the statutes we have illustrated and described herein the best form of the invention now known to us, those skilled in the art will understand that changes may be made in the form of the machine disclosed without departing from the spirit of the invention covered by our claims, and that certain features of our invention may sometimes be used to advantage without a corresponding use of other features.

We claim:

1. A spreader comprising a frame, a drive shaft, mounted in said frame, a driving wheel mounted on said drive shaft, a feed hopper mounted on said frame and having material discharge openings at spaced points in the bottom thereof, and means for spreading the material discharged from said hopper openings including a chain extending along and below the openings in the bottom of said hopper, and means actuated by said drive shaft for reciprocating said chain relative to said hopper.

2. A spreader comprising a frame, a drive shaft mounted in said frame, a driving wheel mounted on said drive shaft, a feed hopper mounted on the rear portion of said frame and having material discharge openings at spaced points in the bottom thereof, means for effecting a uniform distribution of the material discharged from said hopper including a chain extending along and within the bottom of said hopper, a material spreading chain extending along and below the openings in said hopper bottom, and means actuated by said drive shaft for reciprocating said chains relative to said hopper.

3. A spreader comprising a frame, a feed hopper mounted on said frame and having material discharge openings at spaced points in the bottom thereof, a hopper plate arranged adjacent the bottom of said hopper and having discharge openings therein at points intermediate said bottom discharge openings, means for effecting a uniform distribution of the material discharged from said hopper including a chain extending along the upper side of said hopper plate, a second chain extending along and within the bottom of said hopper, a third chain extending along and below the openings in said hopper bottom, and means for reciprocating said chains relative to said hopper.

4. A spreader comprising a frame, a drive shaft mounted in the front end of said frame, a supporting wheel mounted on said drive shaft, a V-shaped feed hopper mounted on the rear portion of said frame and having material discharge openings at spaced points in the bottom thereof, a hopper plate arranged adjacent the bottom of said hopper and having discharge openings therein at points intermediate said bottom discharge openings, and means for effecting a uniform distribution of the material discharged from said hopper including a material agitating and conveying chain extending along the upper side of said hopper plate, a material conveying chain extending along and within the bottom of said hopper, a material spreading chain extending along and below the openings in said hopper bottom, and means actuated by said drive shaft for reciprocating said chains relative to said hopper.

5. A spreader comprising a frame, a drive shaft mounted in said frame, a supporting wheel for driving said drive shaft, a feed hopper mounted on said frame and having material discharge openings at spaced points in the bottom thereof, a hopper plate arranged adjacent the bottom of said hopper and having discharge openings at points intermediate said bottom discharge openings, a chain extending along the upper side of said hopper plate, a second chain extending along and within the bottom of said hopper, a third chain extending along and below the bottom of said hopper, and means for reciprocating said chains relative to said hopper including a reciprocable bar supporting said chains, a rotary cam on said drive shaft having an undulating cam track, a clutch mechanism for operatively connecting said cam to said drive shaft, and a lever having means at one end thereof actuated by said cam track and its opposite end connected to said reciprocable bar.

6. A spreader comprising a frame, a drive shaft mounted in the front end of said frame, a supporting wheel mounted on and driving said shaft, a V-shaped feed hopper mounted on the rear portion of said frame and having material discharge openings at spaced points in the bottom thereof, a hopper plate arranged adjacent the bottom of said hopper and having discharge openings at points intermediate said bottom discharge openings, and means for effecting a uniform distribution of the material discharged from said hopper including a material agitating and conveying chain extending along the upper side of said hopper plate, a material grinding and conveying chain extending along and within the bottom of said hopper, a material spreading chain extending along and below the bottom of said hopper, and means for reciprocating said chains relative to said hopper including a reciprocable bar connected to the ends of said chains, a rotary cam on said drive shaft having an undulating cam track, a clutch mechanism for operatively connecting said cam to said drive shaft, and a lever having means at one end thereof actuated by said cam track and its opposite end connected to said reciprocable bar.

IRVING R. PIERSON.
ALPHONSE AMRHYN.